United States Patent Office 3,595,791
Patented July 27, 1971

3,595,791
BASIC, SULFURIZED SALICYLATES AND
METHOD FOR THEIR PREPARATION
Jerome M. Cohen, Cleveland, Ohio, assignor to The
Lubrizol Corporation, Wickliffe, Ohio
No Drawing. Filed Mar. 11, 1969, Ser. No. 806,289
Int. Cl. C10m 1/24, 1/54
U.S. Cl. 252—33.6
14 Claims

ABSTRACT OF THE DISCLOSURE

Basic metal salts of salicylic acid sulfides are prepared by reacting a salicylic acid, or a salt thereof, with sulfur and an alkaline earth base at a temperature of about 150–250° C., in the presence of an alkylene or polyalkylene glycol or a monoether thereof. The products are useful as detergent additives for lubricants.

This invention relates to new compositions of matter which are useful as lubricant additives, particularly detergent additives, and to methods for their preparation. More particularly, it relates to a method for the preparation of an oil-soluble, basic, sulfurized alkaline earth metal salicylate which comprises (1) preparing a mixture consisting essentially of (A) an aliphatic hydrocarbon-substituted salicylic acid, or an alkali metal or alkaline earth metal salt thereof, (B) sulfur, (C) an alkaline earth base, and (D) as a solvent, a compound of the formula R(OR')$_x$OH, wherein R is hydrogen or a lower alkyl radical, R' is an alkylene radical and $x$ is an integer which is at least 1; the ratio of the number of equivalents of alkaline earth metal to salicylic acid anion in said mixture being at least 1.5:1; (2) heating said mixture to at least 150° C. until reaction is complete; and (3) removing all volatile components from the reaction product.

Basic sulfurized alkaline earth metal salicylates are valuable lubricant additives since they provide detergency and also perform other useful functions such as inhibiting corrosion, neutralizing acids and inhibiting gum formation. The acid-neutralizing ability of such additives is directly proportional to the percentage of alkaline earth metal base which can be incorporated therein. It is of interest, therefore, to prepare oil-soluble compounds of this sort which have the highest possible metal content.

A principal object of the present invention, accordingly, is to provide a method for the production of overbased, sulfurized alkaline earth metal salicylates.

A further object is to provide a method for conveniently preparing lubricant additive compositions containing a high percentage of alkaline earth metal.

A further object is to provide novel compositions of matter which are useful as lubricant additives.

Other objects will in part be obvious and will in part appear hereinafter.

The method of this invention is useful for preparing basic, sulfurized alkaline each metal salicylates in a single-step reaction starting with the salicylic acid or neutral salt thereof, sulfur, and the alkaline earth base. By "alkaline earth" is means the metals of Group II–A of the Periodic Table, particularly magnesium, calcium, strontium and barium. Of these, calcium and barium (especially calcium) are those most frequently used in oil additives. In the remainder of this specification reference will frequently be made to calcium as the alkaline earth metal to be used; however, it is to be understood that the method is equally applicable to the other alkaline earth metals.

Component A in the method of this invention is an aliphatic hydrocarbon-substituted salicylic acid, or an alkali metal or alkaline earth metal salt thereof. The term "salicylic acid" as used herein includes analogous acids derived from fused-ring hydrocarbons (e.g., naphthols and the like). These acids are substituted with alkyl radicals having at least about six carbon atoms and up to as many as 7,000 carbon atoms. Examples of such substituents include hexyl, cyclohexyl, heptyl, decyl, eicosyl, and radicals derived from the polymerization of olefins such as ethylene, propylene, 1-butene, 2-butene, isobutene and the like. Radicals derived from polymers of propylene, 1-butene and isobutene are preferred, especially those having a molecular weight of about 150–1750 (containing about 10–125 aliphatic carbon atoms). In some instances, however, a higher molecular weight radical, e.g., one having a molecular weight of about 50,000–100,000, is desirable since it has been found that such a radical can impart viscosity index improving properties to the composition. The hydrocarbon substituent and the aryl nucleus of the salicylic acid may contain other substituents such as mercapto, halogen, nitro, amino, nitroso, sulfo and disulfo radicals.

The hydrocarbon-substituted salicylic acids may be prepared from the corresponding phenols by the well-known "Kolbe reaction" which comprises reacting a salt, preferably an alkali metal salt, of the phenol with carbon dioxide. This reaction may be carried out at atmospheric or superatmospheric pressure in a suitable solvent, preferably mineral oil. If the Kolbe reaction does not go to completion, the product may still be sufurized and overbased since both the phenates and salicylates are effective additives.

Introduction of the hydrocarbon substituent onto the precursor phenol can be effected by mixing the hydrocarbon and the phenol at a temperature of about 50–200° C. in the presence of a suitable catalyst, such as aluminum trichloride, boron trifluoride, zinc chloride or the like. The radical can also be introduced by other alkylation processes known in the art. It is irrelevant which position on the phenolic ring is substituted; any single isomer, or a mixture of isomers, may be used. The mixture may also contain varying percentages of polysubstituted materials such as dialkyl and trialkyl phenols.

It is usually convenient to use alkali metal or alkaline earth metal salts of the salicylic acids, rather than the free acids, in the method of this invention. The normal calcium salts are preferred; they may be prepared from the free acid by neutralization, or from the alkali metal salicylate by double decomposition with a calicium salt, in a polar solvent such as water or an alcohol. In general, the term "salicylate" when used herein includes the free acid and salts thereof.

Component B of the method of this invention is sulfur, and component C is an alkaline earth metal base. The suitable metals are enumerated above. Any basic compound of these metals may be used, but the preferred bases are the oxides and hydroxides.

Component D, as indicated, is a compound of the formula R(OR')$_x$OH wherein R is hydrogen or a lower alkyl radical, R' is an alkylene radical and $x$ is an integer which is at least 1. By "lower alkyl" herein is meant alkyl radicals containing five or less carbon atoms. Component D is thus an alkylene or polyalkylene glycol or a lower alkyl monoether thereof. The alkylene group (R') is preferably ethylene or propylene; $x$ is preferably 2 or 3; and R is preferably methyl or ethyl.

The boiling point of component D is important because of the necessity for a reaction temperature of at least about 150° C. Any compound which boils below that temperature will, of course, be lost by volatilization during the reaction. On the other hand, a compound with a boiling point substantially above 200° C. will be difficult to remove when the reaction is complete. Therefore, suitable compounds are those which boil above 150° C. and preferably below about 200° C. Especially effective, and preferred, are the mono-(lower alkyl) ethers, particularly the methyl and ethyl ethers, of diethylene glycol. These compounds are under the trade names "Methyl Carbitol" and "Carbitol," respectively.

For the purposes of this application, the term "equivalent weight" refers to the molecular or atomic weight of a substance divided by the number of monovalent reactive units which it provides or with which it will react. The equivalent weight of a salicylic acid is, in this specification, considered to be equal to its molecular weight. The equivalent weight of an alkaline earth base is half its molecular weight, since one molecule thereof will react with two acidic groups or their equivalent. The reaction which takes place between the salicylate and sulfur may be represented as follows (where Ar represents any aryl or alkaryl radical):

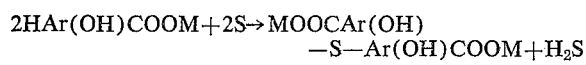

wherein M is hydrogen or one equivalent of an alkali or alkaline earth metal. Accordingly, the equivalent weight of sulfur for the purpose of the present application is equal to its molecular weight, since equimolar quantities of sulfur and the salicylate react. On this basis, the ratio of the number of equivalents of sulfur to salicylate used in the present reaction is usually between about 1:1 and 2:1, while the ratio of the number of equivalents of alkaline earth metal to sailcylate is at least 1.5:1 and is preferably between about 2:1 and 5:1.

In carrying out the method of this invention, the components are mixed and heated to a temperature above about 150° C., and preferably about 150–250° C. Since the reaction proceeds only at temperatures above about 150° C., it is necessary that the reaction mixture contain no constituents which will be volatilized and lost below that temperature. Ordinarily, the reaction is carried out in a solvent or combination of solvents. Component D may serve as the solvent or at least as part of it; thus, it is usually present in considerable excess. Other materials which may be used as solvents include alcohols, ethers, ketones, hydrocarbons, chlorinated hydrocarbons and the like. The preferred solvent is a high-boiling mineral oil fraction, which is generally used in combination with component D.

Upon heating the reaction mixture to above about 150° C., there occurs evolution of hydrogen sulfide (formed by the reaction of sulfur with the salicylate) and water (formed by the reaction of the calcium base with the salicylate). Ordinarily, some solvent is also lost by volatilization at this stage. The volatilized material is preferably collected in a cooled receiver, and the evolved hydrogen sulfide may be conveniently absorbed in a caustic solution and measured as an index of the course of the reaction. When hydrogen sulfide evolution has ceased, the reaction is for practical purposes complete.

It is possible to obtain, by this method, materials with a metal ratio as high as 5 which are useful as lubricant additives. The term "metal ratio" is used herein to denote the ratio of the number of equivalents of metal actually incorporated into the composition to the number of equivalents of metal in the normal metal salt. Thus, a composition with a metal ratio of 2.5 contains 2.5 times as much metal as the normal salt.

The compositions prepared as described above are particularly useful in diesel engine lubricants, especially for railroad diesel engines. For other lubricant applications, it is frequently desirable to further react the compositions with carbon dioxide. This reaction may be effected at a temperature between about 130° C. and 180° C., preferably about 160–170° C., by passing carbon dioxide through the reaction mixture.

After the reaction is complete (with or without carbonation), the volatile constituents are removed from the reaction mixture. The major part of this volatile matter generally comprises component D; it may be removed by distillation, preferably at reduced pressure. Distillation temperatures up to about 200° C. are adequate at pressures below about 50 millimeters of mercury.

The method of this invention is illustrated by the following examples. All parts and percentages are by weight.

EXAMPLE 1

To 800 parts (1.0 mole) of a 78% solution in mineral oil of the potassium salt of a polyisobutene-substituted salicyclic acid, wherein the polyisobutene substituent has a molecular weight of about 450, is added, at 120° C., 340 parts of diethylene glycol monomethyl ether, 74 parts (2.0 equivalents) of calcium hydroxide and 32 parts (1 equivalent) of sulfur. The mixture is heated to 135–147° C. for two hours, under nitrogen, and the temperature is then increased to 240–245° C. for 3½ hours. Hydrogen sulfide is evolved and volatile matter, including water of reaction, is separated by distillation during this period. After reaction is complete, the product is filtered. The filtrate, a 68% solution in oil of the desired basic, sulfurized calcium salicylate, contains 17.99% calcium sulfate ash and 1.85% sulfur. The metal ratio is 1.4.

EXAMPLE 2

To 990 parts (1.26 equivalents) of a 63.4% solution in mineral oil of the potassium salt of a polyisobutene-substituted salicyclic acid, wherein the polyisobutene substituent has a molecular weight of about 325, is added, at 98° C., a solution of 76 parts (1.31 equivalents) of calcium chloride in 90 parts of water. The mixture is heated at 152–170° C., under nitrogen, for 3.3 hours, during which time the bulk of the water is lost by distillation. The residue is cooled to 93° and 420 parts of diethylene glycol monomethyl ether, 89 parts (1.75 equivalents) of calcium hydroxide and 38 parts (1.2 equivalents) of sulfur are added. The mixture is heated under nitrogen at 132–137° C. for two hours, after which time an antifoam agent is added and the mixture is heated at 243–250° C. for 3 hours. During this time, hydrogen sulfide is evolved and 398 parts of volatile matter is lost by distillation. The product is diluted with 176 parts of mineral oil and cooled to 150° C. It is then filtered; the filtrate, a 57% solution in oil, contains 4.55% calcium and 1.10% sulfur. The metal ratio is 2.2.

EXAMPLE 3

A solution of 405 parts (7.0 equivalents) of calcium chloride in 818 parts of water is added, at 55° C., to 6188 parts (7.0 equivalents) of a 55% solution in mineral oil of the potassium salt of a polyisobutene-substituted salicylic acid, wherein the polyisobutene substituent has a molecular weight of about 310. The mixture is heated to reflux for 3 hours and then the water is removed by distillation at 155° C.

The residue is cooled to 100° C. and 2500 parts of diethylene glycol monomethyl ether, 518 parts (14.0 equivalents) of calcium hydroxide and 224 parts (3.5 equivalents) of sulfur are added. The mixture is heated under nitrogen to 190° C., and then at 210–220° C. until all volatile material has been removed. After filtration, the product (a 56% solution in oil) contains 17.58% calcium sulfate ash and 1.49% sulfur, and has a metal ratio of 2.35.

EXAMPLE 4

Following the procedure of Example 3, a basic, sulfurized calcium salicylate is prepared from 6 equivalents of the potassium polyisobutene-substituted salicylate, 6 equivalents of calcium chloride, 2100 parts of diethylene glycol monomethyl ether, 12 equivalents of calcium hydroxide and 6 equivalents of sulfur. The product, a 65% solution in oil, contains 19.0% calcium sulfate ash and 1.24% sulfur; the metal ratio is 2.5.

EXAMPLE 5

Following the procedure of Example 3, a basic, sulfurized calcium salicylate is prepared from one equivalent of the potassium polyisobutene-substituted salicylate, 1.1 equivalents of calcium chloride, 350 parts of diethylene glycol monomethyl ether, 2 equivalents of calcium hydroxide and 1 equivalent of sulfur. The product is diluted with mineral oil to a concentration of 53%. It contains 18.1% calcium sulfate ash and 0.98% sulfur; the metal ratio is 2.9.

EXAMPLE 6

A product similar to that of Example 3 is prepared, replacing about half of the diethylene glycol monomethyl ether with o-dichlorobenzene. The product, a 50% solution in oil, contains 15.41% calcium sulfate ash and 1.0% sulfur and has a metal ratio of 2.5.

EXAMPLE 7

A product similar to that of Example 3 is prepared, replacing about 36% of the diethylene glycol monomethyl ether with xylene. The product contains 17.54% calcium sulfate ash and 1.01% sulfur, and has a metal ratio of 2.8. It is obtained as a 53% solution in mineral oil.

EXAMPLE 8

Following the procedure of Example 3, 5201 parts (7.0 equivalents) of a 73% solution in xylene of a potassium polyisobutene-substituted salicylate, wherein the polyisobutene substituent has a molecular weight of about 365, is reacted with an aqueous solution of 405 parts (7.0 equivalents) of calcium chloride. To the resulting normal calcium salt is added 518 parts (14 equivalents) of calcium hydroxide, 3797 parts of diethylene glycol monomethyl ether and 224 parts (7 equivalents) of sulfur. The mixture is heated under nitrogen, with stirring, for 8½ hours at temperatures attaining a maximum of 178° C. At the end of this time, 259 parts of this mixture is removed and filtered. The remainder is blown with carbon dioxide at 140–150° C. for 4 hours. During this period, 2000 parts of mineral oil is added. Upon filtration and further dilution with oil, there is obtained a 60% solution in mineral oil of the desired carbonated product which has a calcium sulfate ash concentration of 15.41%, a sulfur content of 1.21% and a metal ratio of 2.3.

EXAMPLE 9

One equivalent of the potassium polyisobutene-substituted salicylic acid of Example 3 is reacted with calcium chloride and subsequently with 111 parts (3.0 equivalents) of calcium hydroxide, 32 parts (1 equivalent) of sulfur and 550 parts of diethylene glycol monomethyl ether, at a maximum temperature of 245° C. The product is diluted with 200 parts of mineral oil and filtered, yielding the desired basic salt in the form of a 55% mineral oil solution. The solution contains 19.09% calcium sulfate ash and 1.09% sulfur, and has a metal ratio of 3.2.

EXAMPLE 10

The potassium polyisobutene-substituted salicylate of Example 3 (1.06 equivalents) is reacted with one equivalent of calcium chloride to form the normal calcium salt, which is then reacted with 1.5 equivalents of sulfur and 2 equivalents of calcium hydroxide in the presence of diethylene glycol monomethyl ether as solvent, following a procedure similar to that of Example 3. The maximum temperature is 237° C. The product contains 21.98% calcium sulfate ash and 1.57% sulfur, and has a metal ratio of 2.85.

EXAMPLE 11

Following the procedure of Example 3, a basic sulfurized product is prepared from one equivalent of the potassium polyisobutene-substituted salicylate, 1.05 equivalents of calcium chloride, 2 equivalents of calcium hydroxide and 2 equivalents of sulfur in the presence of 340 parts of diethylene glycol monomethyl ether. The product contains 19.21% calcium sulfate ash and 1.65% sulfur, and has a metal ratio of 2.5.

EXAMPLE 12

A mixture of 120 parts (0.25 equivalent) of a mineral oil solution of a polyisobutenyl phenol corresponding to the salicylate of Example 3, and 619 parts (0.75 equivalent) of the potassium polyisobutenyl-substituted salicylate itself, is reacted with 0.75 equivalent of calcium chloride and the mixture obtained thereby is further reacted with 2 equivalents of calcium hydroxide and 1.5 equivalents of sulfur in the presence of 400 parts of diethylene glycol monomethyl ether, following the procedure of Example 3. The product is diluted with mineral oil to a concentration of 58%. It contains 16.97% calcium sulfate ash and 1.81% sulfur, and has a metal ratio of 2.5.

EXAMPLE 13

A solution of 36.7 parts (0.635 equivalent) of calcium chloride and 74 parts of water is added to 1622 parts (0.635 equivalent) of a 59% mineral oil solution of a potassium polyisobutenyl-substituted salicyclic acid wherein the polyisobutene substituent has a molecular weight of about 1400. The mixture is heated under reflux for 3 hours and then the water is removed by distillation. The residue is cooled to room temperature and 47 parts (1.27 equivalents) of calcium hydroxide, 20.3 parts (0.635 equivalent) of sulfur and 214 parts of diethylene glycol monomethyl ether are added. The mixture is heated to 210° C. and held at this temperature for 1 hour, after which time the pressure in the system is reduced and volatile constituents are removed. Upon filtration, there is obtained a 53% oil solution of the desired basic, sulfurized salicylate containing 4.93% calcium sulfate ash and 0.508% sulfur, and having a metal ratio of 1.9.

EXAMPLE 14

An aqueous solution of 2 equivalents of calcium chloride is reacted with 950 parts (2.0 equivalents) of an 86% solution in mineral oil of a potassium polypropylene-substituted salicylate (wherein the polypropylene substituent has a molecular weight of about 240) to obtain the normal calcium salicylate. This calcium salt is then reacted with 148 parts (4 equivalents) of calcium hydroxide and 64 parts (2 equivalents) of sulfur in the presence of 680 parts of diethylene glycol monomethyl ether, following the procedure of Example 3. The product is diluted with 200 parts of mineral oil and filtered. The filtrate, which is the desired product, is a 56% solution in mineral oil of the basic, sulfurized calcium salicylate containing 28.82% calcium sulfate ash and 1.76% sulfur and having a metal ratio of 2.9.

EXAMPLE 15

Following the procedure of Example 14, a basic sulfurized calcium salicylate is prepared from 1.26 equivalents of the potassium polypropylene-substituted salicylate, 1.57 equivalents of calcium chloride, 3 equivalents of calcium hydroxide, 1.5 equivalents of sulfur, and 510 parts of diethylene glycol monomethyl ether. Mineral oil is added to form a 45% solution therein. The product has a calcium sulfate ash content of 16.9%, a sulfur content of 0.97% and a metal ratio of 3.1.

EXAMPLE 16

A mixture of 0.5 equivalent each of the potassium polyisobutene-substituted salicylate of Example 3 and the corresponding polyisobutene-substituted phenol is treated with 0.5 equivalent of calcium chloride and then with 2 equivalents of calcium hydroxide and 1.5 equivalents of sulfur, in the presence of 500 parts of diethylene glycol monomethyl ether, following the procedure of Example 3. The product is diluted with 175 parts of mineral oil and filtered, yielding a 62% solution in oil of the desired basic, sulfurized calcium salt containing 17.46% calcium sulfate ash and 2.30% sulfur and having a metal ratio of 2.2.

EXAMPLE 17

A basic sulfurized calcium salt is prepared from one equivalent of the potassium polyisobutene-substituted salicylate of Example 3, 1.1 equivalents of calcium chloride (in methanol solution), one equivalent each of calcium hydroxide and sulfur and 354 parts of ethylene glycol monobutyl ether. After fiiltration, there is obtained a 65% solution of mineral oil of the desired product containing 17.96% calcium sulfate ash and 1.88% sulfur, and having a metal ratio of 2.34.

EXAMPLE 18

The procedure of Example 17 is repeated, substituting ethylene glycol for the ethylene glycol monobutyl ether on an equal weight basis. A similar product is obtained.

The basic, sulfurized salicylates of this invention can be effectively employed in a variety of lubricating compositions based on diverse oils of lubricating viscosity, including natural and synthetic lubricating oils and mixtures thereof. The lubricating compositions contemplated include principally crankcase lubricating oils for spark-ignited and compression-ignited internal combustion engines including automobile and truck engines, two-cycle engine lubricants, aviation piston engines, marine and railroad diesel engines, and the like. However, automatic transmission fluids, transaxle lubricants, gear lubricants, metal-working lubricants, hydraulic fluids, and other lubricating oil and grease compositions can benefit from the incorporation of the present compositions.

Natural oils include animal oils and vegetable oils (e.g., castor oil, lard oil) as well as solvent-refined or acid-refined mineral lubricating oils of the paraffinic, naphthenic, or mixed paraffinic-naphthenic types. Oils of lubricating viscosity derived from coal or shale are also useful base oils. Synthetic lubricating oils include hydrocarbon oils and halo-substituted hydrocarbon oils such as polymerized and interpolymerized olefins (e.g., polybutylenes, polypropylenes, propylene-isobutylene copolymers, chlorinated polybutylene, etc.); alkyl benzenes (e.g., dodecylbenzenes, tetradecylbenzene, dinonylbenzenes, di-(2-ethylhexyl)benzenes, etc.); polyphenyls (e.g., biphenyls, terphenyls, etc.); and the like. Alkylene oxide polymers and interpolymers and derivatives thereof where the terminal hydroxyl groups have been modified by esterification, etherification, etc., constitute another class of known synthetic lubricating oils. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of 1000, diphenyl ether of polyethylene glycol having a molecular weight of 500–1000, diethyl ether of polypropylene glycol having a molecular weight of 1000–1500, etc.) or mono- and polycarboxylic esters thereof, for example, the acetic acid esters, mixed $C_3$–$C_8$ fatty acid esters, or the $C_{13}$ Oxo acid diester of tetraethylene glycol. Another suitable class of synthetic lubricating oils comprises the esters of dicarboxylic acids (e.g., phthalic acid, succinic acid, maleic acid, azelaic acid, suberic acid, sebacic acid, fumaric acid, adipic acid, linoleic acid dimer, etc.) with a variety of alcohols (e.g., butyl alcohol, hexyl alcohol, dodecyl alcohol, 2-ethylhexyl alcohol, pentaerythritol, etc.). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid, and the like. Silicon-based oils such as the polyalkyl-, polyaryl-, polyalkoxy-, or polyaryloxy-siloxane oils and silicate oils comprise another useful class of synthetic lubricants (e.g., tetraethyl silicate, tetraisopropyl silicate, tetra-(2-ethylhexyl) silicate, tetra-(4-methyl-2-tetraethyl) silicate, tetra - (p - tert-butylphenyl) silicate, hexyl-(4-methyl - 2 - pentoxy)-disiloxane, poly(methyl)-siloxanes, poly(methylphenyl)-siloxanes, etc.). Other synthetic lubricating oils include liquid esters of phosphorus-containing acids (e.g., tricresyl phosphate, trioctyl phosphate, diethyl ester of decane phosphonic acid, etc.), polymeric tetrahydrofurans, and the like.

In general, about 0.05–20.0 parts (by weight) of the composition of this invention (excluding diluent oil) is dissolved in 100 parts of oil to produce a satisfactory lubricant. The invention also contemplates the use of other additives in combination with the products of this invention. Such additives include, for example, auxiliary detergents and dispersants of the ash-containing or ashless type, viscosity index improvers, oxidation inhibiting agents, pour point depressing agents, extreme pressure agents, color stabilizers and anti-foam agents.

The ash-containing detergents are exemplified by oil-soluble neutral and basic salts of alkali or alkaline earth metals with sulfonic acids, carboxylic acids, or organic phosphorous acids characterized by at least one direct carbon-to-phosphorus linkage such as those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium and barium. The term "basic salt" is used to designate metal salts wherein the metal is present in stoichiometrically larger amounts than the organic acid radical. The commonly employed methods for preparing the basic salts involve heating a mineral oil solution of an acid with a stoichiometric excess of a metal neutralizing agent such as the metal oxide, hydroxide, carbonate, bicarbonate, or sulfide at a temperature above 50° C. and filtering the resulting mass. The use of a "promoter" in the neutralization step to aid the incorporation of a large excess of metal likewise is known. Examples of compounds useful as the promoter include phenolic substances such as phenol, naphthol, alkylphenol, thiophenol, sulfurized alkylphenol, and condensation products of formaldehyde with a phenolic substance; alcohols such as methanol, 2-propanol, octyl alcohol, Cellosolve Carbitol, ethylene glycol, stearyl alcohol, and cyclohexyl alcohol; and amines such as aniline, phenylenediamine, phenothiazine, phenyl-$\beta$-naphthylamine, and dodecylamine. A particularly effective method for preparing the basic salts comprises mixing an acid with an excess of a basic alkaline earth metal neutralizing agent, a phenolic promoter compound, and a small amount of water and carbonating the mixture at an elevated temperature such as 60–200° C.

Ashless detergents and dispersants are exemplified by the interpolymers of an oil-solubilizing monomer, e.g., decyl methacrylate, vinyl decyl ether, or high molecular weight olefin with a monomer containing polar substituents, e.g., amino-alkyl acrylate or poly-(oxyethylene)-substituted acrylate; the amine salts, amides, and imides of oil-soluble monocarboxylic or dicarboxylic acids such as stearic acid, oleic acid, tall oil acid, and high molecular weight alkyl or alkenyl-substituted succinic acid. Especially useful as ashless detergents are the acylated polyamines and similar nitrogen compounds containing at least about 54 carbon atoms described in U.S. Pat. 3,272,746; reaction products of such compounds with other reagents including boron compounds, phosphorus compounds, epoxides, aldehydes, organic acids and the like; and esters of hydrocarbon-substituted succinic acids as described in U.S. Pat. 3,381,022.

Extreme pressure agents and corrosion-inhibiting and oxidation-inhibiting agents are exemplified by chlorinated aliphatic hydrocarbons such as chlorinated wax; organic sulfides and polysulfides such as benzyl disulfide, bis(chlorobenzyl) disulfide, dibutyl tetrasulfide, sulfurized sperm oil, sulfunized methyl ester of oleic acid, sulfurized alkylphenol, sulfurized dipentene, and sulfurized alkylpenol, sulfurized dipentene, and sulfurized terpene; phosphosulfurized hydrocarbons such as the reaction product of a phosphorus sulfide with turpentine or methyl oleate; phosphorus esters including principally dihydrocarbon and and trihydrocarbon phosphites such as dibutyl phosphite, diheptyl phosphite, dicyclohexyl phosphite, pentyl phenyl phosphite, dipentyl phenyl phosphite, tridecyl phosphite, distearyl phosphite, dimethyl naphthyl phosphite, oleyl 4-pentylphenyl phosphite, polypropylene (molecular weight 500)-substituted phenyl phosphite, diisobutyl-substituted phenyl phosphite; metal thiocarbamates, such as zinc dioctyldithocarbamate, and barium heptylphenyl dithiocarbamate; Group II metal phosphorodithioates such as zinc dicyclohexylphosphorodithioate, zinc dioctylphosphorodithioate, barium di(heptylphenyl)phosphorodithioate, cadmium dinonylphosphorodithioate, and the zinc salt of a phosphorodithioic acid produced by the reaction of phosphorus pentasulfide with an equimolar mixture of isopropyl alcohol and n-hexyl alcohol.

Illustrative lubricating compositions containing the compositions of this invention are given in Tables I and II. In each table, the "mineral oil" entry includes small amounts of diluent oil used for forming oil solutions of a number of the other ingredients.

TABLE I

| Ingredient | Lubricant, parts by weight | | | |
|---|---|---|---|---|
| | A | B | C | D |
| SAE 30 mineral oil | 94.22 | | | |
| SAE 40 mineral oil | | 98.66 | 94.29 | 91.98 |
| Product of Example 2 | | | 1.51 | 4.24 |
| Product of Example 3 | 2.84 | | | |
| Product of Example 8 | | 1.34 | | |
| Basic calcium petroleum sulfonate (metal ratio 1.4) | 0.43 | | | |
| Reaction product of calcium salt of tetrapropylene-substituted phenol with paraformaldehyde | | | 1.92 | 1.92 |
| Reaction product of sodium petroleum sulfonate with 0.1% hydrogen peroxide | 0.84 | | | |
| Reaction product of polyisobutenyl succinic anhydride with polyethylene polyamine mixture | 1.56 | | | |
| Reaction product of chlorinated polyisobutene-acrylic acid condensate with polyethylene polyamine mixture | | | 2.21 | 0.61 |
| Reaction product of above-identified acrylic acid-amine derivative with a mineral acid-treated clay | | | | 1.19 |
| Butyl 4-cyclohexenecarboxylate | | | 0.04 | 0.037 |
| Sulfurized isobutene | | | 0.03 | 0.024 |
| Disalicyial propylene diimine (80% solution in xylene) | 0.11 | | | |
| Silicone anti-foam agent | 0.003 | | 0.005 | 0.005 |

TABLE II

| Ingredient | Lubricant, parts by weight | | |
|---|---|---|---|
| | E | F | G |
| SAE 40 mineral oil | 91.75 | 94.91 | 94.88 |
| Product of Example 2 | 4.24 | | |
| Product of Example 4 | | 1.41 | |
| Product of Example 15 | | | 1.78 |
| Reaction product of normal calcium polyisobutene-substituted salicylate with ethylenediamine and paraformaldehyde | 1.77 | | |
| Reaction product of calcium salt of tetrapropylene-substituted phenol with paraformaldehyde | | 1.64 | |
| Reaction product of heptylphenol with calcium hydroxide and paraformaldehyde | | | 1.45 |
| Reaction product of chlorinated polyisobutene-acrylic acid condensate with polyethylene polyamine mixture | 2.21 | 0.28 | 1.25 |
| Zinc salt of reaction product of polyisobutenyl succinic anhydride with polyethylene polyamine mixture | | 0.63 | |
| Reaction product of polyisobutenyl succinic anhydride-polyethylene polyamine condensate with carbon disulfide | | | 0.64 |
| Product obtained by blending equal weights of above-identified carbon disulfide reaction product and a polyisobutenyl succinic anhydride-polyethylene polyamine reaction product, and treating with a mineral acid-treated clay | | 1.13 | |
| Sulfurized isobutene | 0.03 | | |
| Silicone anti-foam agent | 0.005 | 0.005 | 0.005 |

The utility of the compositions of this invention as detergent additives for lubricants is shown by the Caterpillar Engine 1–G Test. This test evaluates the general properties of a lubricant with particular reference to detergency. In the test the lubricating composition to be tested is placed in the crackcase of a diesel test engine having a 5⅛ inch bore, operated at a constant speed and B.t.u. input. A fuel containing 0.4% sulfur is used. The conditions of the testing operation are as follows:

Speed—1800±10 r.p.m.
Fuel rate—5850±50 B.t.u./min., 0.3 lb./min.
Oil temperature—205±5° F.
Oil pressure—30±1 p.s.i.
Intake air temperature—255±5° F.
Intake air pressure—53.0±0.3 in. Hg abs.

The piston is evaluated at 120-hour intervals for percent top groove filling and total deposits on lands, grooves, groove sides, ring sides, skirt, crown, and under the piston crown (on a scale of 0–100, 0 being indicative of extremely heavy deposits and 100 of no deposits).

When evaluated by this method, Lubricant C gave 6% top groove filling and a deposit rating of 87.5 after 120 hours. Lubricant D gave 7% top groove filling and a deposit rating of 90.5 after 240 hours.

The Caterpillar Engine 1–H test is similar to the 1–G test described above, except that the fuel rate is 4950±50 B.t.u./min. (0.255 lb./min.), the oil temperature is 180±5° F., the intake air temperature is 170±5° F., and the intake air pressure is 40.0±0.3 in. Hg abs. When evaluated by this test, Lubricant A gave 1% top grove filling and a deposit rating of 95.5 after 480 hours.

The performance of lubricants containing the compositions of this invention in two-cycle engines is evaluated by the McCulloch Variable Temperature Test. In this test, the oil is used in a 7-horsepower McCulloch chain saw engine mounted on a 55-gallon drum and atached to a hydraulic pump. The fuel-to-oil ratio is 20:1, the test duration is 14 hours, the speed of the engine is 5000±50 r.p.m., and the spark plug gasket temperature is 475±10° F. At the end of the test, the engine is dismantled and the varnish on the piston and on the engine parts is rated on a scale form 0 to 10, with 10 representing a completely clean engine. Deposit formation is also evaluated.

When tested by this method, Lubricant B gave a piston varnish rating of 7.5 and a general engine varnish rating of 10.0. The engine was substantially clean of deposits.

What is claimed is:

1. A method for the preparation of an oil-soluble, basic, sulfurized alkaline earth metal salicylate which comprises (1) preparing a mixture consisting essentially of (A) an aliphatic hydrocarbon-substituted salicylic acid, or an alkali metal or alkaline earth metal salt thereof, (B) sulfur, (C) an alkaline earth base, and (D) as a solvent, a compound of the formula $R(OR')_xOH$, wherein R is hydrogen or a lower alkyl radical, R' is an alkylene radical and $x$ is an integer which is at least 1; the ratio of the number of equivalents of alkaline earth metal to salicylic acid anion in said mixture being at least 1.5:1; (2) heating said mixture to at least 150° C. until reaction is complete; and (3) removing all volatile components from the reaction product.

2. The method of claim 1 wherein component A is an alkaline earth metal salt of an aliphatic hydrocarbon-substituted salicylic acid wherein the aliphatic hydrocarbon substituent contains at least about 6 carbon atoms.

3. The method of claim 2 wherein the aliphatic hydrocarbon substituent is derived from a polymer of isobutene and contains about 10–125 aliphatic carbon atoms.

4. The method of claim 3 wherein component C is calcium oxide or hydroxide.

5. The method of claim 4 wherein R of component D is alkyl and $x$ is 2 or 3.

6. The method of claim 3 wherein component D is diethylene glycol monomethyl ether.

7. The method of claim 2 wherein component A is an alkaline earth metal salt of a polyisobutenyl salicylic acid wherein the polyisobutenyl radical contains about 10–125 aliphatic carbon atoms; component C is calcium hydroxide; component D is diethylene glycol monomethyl ether;; the reaction temperature during formation of the basic sulfide is about 150–250° C., and the volatile components are removed by distillation.

8. The method of claim 1 wherein the reaction mixture is reacted with carbon dioxide at a temperature of about 130–180° C., prior to the removal of volatile components.

9. The product of the method of claim 1.
10. The product of the method of claim 3.
11. The product of the method of claim 4.
12. The product of the method of claim 7.

13. A lubricating composition comprising a major amount of a mineral lubricating oil and a minor amount of the composition of claim 10.

14. A lubricating composition comprising a major amount of a mineral lubricating oil and a minor amount of the composition of claim 12.

References Cited
UNITED STATES PATENTS
Re. 26,811  3/1970  Cohen _____ 252—42.7X DANIEL E. WYMAN, Primary Examiner W. H. CANNON, Assistant Examiner U.S. Cl. X.R.

252—18, 42.7; 260—516